United States Patent
Bader et al.

(10) Patent No.: US 8,083,478 B2
(45) Date of Patent: Dec. 27, 2011

(54) EXHAUST CASING FOR A TURBOMACHINE

(75) Inventors: Valentine Bader, Vaux Le Penil (FR);
Laurent Marnas, Vaux Le Penil (FR);
Nicolas Pommier, Brunoy (FR);
Christian Schnell, Forges (FR)

(73) Assignee: SNECMA, Paris (FR)

( * ) Notice: Subject to any disclaimer, the term of this patent is extended or adjusted under 35 U.S.C. 154(b) by 866 days.

(21) Appl. No.: 12/139,021

(22) Filed: Jun. 13, 2008

(65) Prior Publication Data
US 2008/0310958 A1 Dec. 18, 2008

(30) Foreign Application Priority Data
Jun. 13, 2007 (FR) ...................................... 07 55718

(51) Int. Cl.
*F03D 11/04* (2006.01)
(52) U.S. Cl. .................................................. 415/211.2
(58) Field of Classification Search .............. 415/211.2
See application file for complete search history.

(56) References Cited

U.S. PATENT DOCUMENTS

| 2,744,722 | A |   | 5/1956 | Orr |
| 2,936,999 | A |   | 5/1960 | Coar et al. |
| 4,057,371 | A | * | 11/1977 | Pilarczyk ...................... 417/409 |
| 5,228,832 | A | * | 7/1993 | Nishida et al. ............. 415/208.1 |
| 2005/0186070 | A1 | * | 8/2005 | Zeng et al. ................. 415/211.2 |
| 2009/0151911 | A1 | * | 6/2009 | De Filippis et al. .......... 165/122 |

FOREIGN PATENT DOCUMENTS

FR 2 824 598 11/2002
GB 630277 10/1949

* cited by examiner

Primary Examiner — George Fourson, III
(74) Attorney, Agent, or Firm — Oblon, Spivak, McClelland, Maier & Neustadt, L.L.P.

(57) ABSTRACT

A turbomachine exhaust casing with connection roots between the structural arms of the casing and the annular endplates of the hub of the casing, each of said the roots having a profile that is optimized so as to reduce the level of stress in the connection portions, and thus increase the lifetime of the exhaust casing.

2 Claims, 3 Drawing Sheets

EXHAUST CASING FOR A TURBOMACHINE

The invention relates to an exhaust casing for a turbomachine. It is applicable to any type of turbomachine, whether terrestrial or for aviation purposes, and more particularly to airplane turbojets.

BACKGROUND OF THE INVENTION

More precisely, the invention relates to an exhaust casing for a turbomachine, the casing comprising:
  a hub centered on an axis and carrying, on each of its upstream and downstream faces, an annular endplate that is coaxial with the hub;
  an outer shroud coaxial with the hub; and
  a plurality of arms interconnecting said hub and said shroud, each arm presenting opposite first and second side faces in which the hub and the outer shroud are spaced apart radially by a length written L;
  in which, in a radial section plane, the first side face of each arm forms an acute angle with the tangent to the outer periphery of each endplate, said angle lying in the range 60° to 85°; and
  in which the first side face of each arm is connected to each endplate via a connection portion.

In the present application, "upstream" and "downstream" are defined relative to the normal flow direction of fluid flowing through the turbomachine (from upstream to downstream). Furthermore, the axial direction corresponds to the direction of the axis of rotation A of the turbomachine rotor, and a radial direction is a direction perpendicular to the axis A. Similarly, an axial plane is a plane that includes the axis of rotation A, and a radial plane is a plane perpendicular to the axis A. Finally, unless specified to the contrary, adjectives such as "inner" and "outer" are used with reference to a radial direction such that an inner (i.e. radially inner) portion of an element is closer to the axis A than is the outer (i.e. radially outer) portion of the same element.

Accompanying FIGS. 1 to 3 show an example of an exhaust casing 12 of the above-specified type.

FIG. 1 is a view of a two-spool bypass turbojet 1 in axial section, i.e. in section on a plane containing the axis of rotation A of the rotor of the turbojet. From upstream to downstream, the turbojet 1 comprises: a fan 2; a low-pressure compressor 4; a high-pressure compressor 6; a high-pressure turbine 8; a low-pressure turbine 10; and said exhaust casing 12.

The casing 12 is thus situated downstream from the low-pressure turbine 10. The casing 12 contributes to defining the primary flow section of the fluid passing through the turbojet. Furthermore, the casing 12 supports the rotor of the turbojet and ensures that the rotor and the stator are coaxial. Finally, the oil that lubricates the bearings of the turbojet is fed and removed via the casing 12.

With reference to FIGS. 2 and 3, the casing 12 comprises:
  a hub 14 centered on the axis A and carrying on its upstream and downstream faces respective upstream and downstream annular endplates 16 and 18, coaxial with the hub 14;
  an outer shroud 20 coaxial with the hub 14; and
  a plurality of arms 22 connecting the hub 14 to the shroud 20 (there being sixteen arms in the example shown).

The upstream and downstream annular endplates 16 and 18 are contained in substantially radial planes and they project outwards towards the shroud 20.

Each arm 22 presents first and second opposite side faces 22a and 22b. In a radial plane, such as the plane of FIG. 3, the first side face 22a of each arm 22 forms an acute angle "a" with the tangent to the outer periphery of each endplate 16, 18, the angle "a" lying in the range 60° to 85°. Furthermore, the first side face 22a of each arm 22 is connected to each endplate 16, 18 via a connection portion 24.

The lifetime of presently known exhaust casings is found to be insufficient, and an object of the invention is to increase said lifetime.

In their research leading to the present invention, the inventors found that when the turbojet is in operation, the exhaust casing is subjected to a temperature gradient between the outer shroud and the hub, which temperature gradient gives rise to stresses in the connection portion; and since the level of stress reached in this connection portion is high, the lifetime of the casing suffers therefrom.

Until now, in known exhaust casings, the profile of the connection portion in a radial section plane has been defined by a circular arc having a radius of 3 millimeters (mm).

OBJECTS AND SUMMARY OF THE INVENTION

The invention proposes an exhaust casing of the above-specified type having a connection portion with a profile that is optimized in such a manner as to reduce the level of stress in the connection portion, and thus increase the lifetime of the exhaust casing.

Thus, the present invention provides an exhaust casing for a turbomachine, the casing comprising:
  a hub centered on an axis and carrying, on each of its upstream and downstream faces, an annular endplate that is coaxial with the hub;
  an outer shroud coaxial with the hub; and
  a plurality of arms interconnecting said hub and said shroud, each arm presenting opposite first and second side faces in which the hub and the outer shroud are spaced apart radially by a length written L;
  in which, in a radial section plane, the first side face of each arm forms an acute angle with the tangent to the outer periphery of each endplate, said angle lying in the range 60° to 85°; and
  in which the first side face of each arm is connected to each endplate;
  wherein the first side face of each arm is connected to each endplate by a connection root of profile, in a radial section plane, that is defined by a spline passing via N control points, N being an integer greater than or equal to 10, these N control points being defined as follows:
  let O be the point of intersection in said radial section plane between the straight line extending the first side face and the outer periphery of an endplate;
  let there be a first straight-line segment H starting from the point O and following the straight line extending said first side face in said radial plane, this segment being of length written $\ell 1$ lying in the range 3% to 15% of the length L, and this segment being subdivided into N equal segments by N+1 points written H(1), H(2), ..., H(N+1), the point H(N+1) coinciding with the point O;
  let there be a second straight-line segment B starting from the point O and following the tangent at the point O to the outer periphery of said endplate in said radial plane, said segment having a length written $\ell 2$ lying in the range 25% to 50% of $\ell 1$, and said segment being subdivided into N equal segments by N+1 points written B(1), B(2), ..., B(N+1), the point B(N+1) being the furthest from the point O, and let D(1), D(2), ..., D(N+1) be the N+1 straight lines respectively interconnecting the points B(1) to H(1), B(2) to H(2), ..., and B(N+1) to H(N+1);

said N control points are the points of intersection between D(1) and D(2), between D(2) and D(3), ..., and between D(N) and D(N+1).

It should be recalled that the length written L is the radial distance between the hub and the outer shroud of the casing.

According to the invention, the profile of the connection root is thus a spline (a spline curve) that is determined in particular by the lengths selected for the two parameters $\ell 1$ and $\ell 2$.

The length $\ell 1$ is selected to be greater than 3% of the length L so that the profile of the connection root is sufficiently extended to provide a good distribution of stresses in the root. This good distribution is a precondition for a lower level of stress, and thus improves the lifetime of the casing. In addition, when the length $\ell 1$ is less than 3% of the length L, the feasibility problems can be encountered in the connection root, in particular when the casing is made by casting.

The length $\ell 1$ is selected to be less than 15% of the length L so as to avoid excessively stiffening the connection between the hub and the arm, and so as to limit the weight of the casing.

In analogous manner, the length $\ell 2$ is selected to be greater than 25% of the length $\ell 1$ so as to ensure a good distribution of the stresses in the connection portion, and so as to guarantee that the connection root can be made, in particular by casting. The length $\ell 2$ is selected to be less than 50% of the length $\ell 1$ so as to avoid excessively stiffening the connection between the hub and the arm in question, and so as to limit the weight of the casing.

The shape selected for the profile of the connection root, namely a spline, also contributes to optimizing the distribution of stresses in the root, and thus to minimizing the level of stress in said root so as to improve the lifetime of the casing.

BRIEF DESCRIPTION OF THE DRAWINGS

The invention and its advantages can be better understood on reading the following detailed description of an embodiment of an exhaust casing of the invention. This detailed description makes reference to the accompanying figures, in which.

MORE DETAILED DESCRIPTION

Figure 1:
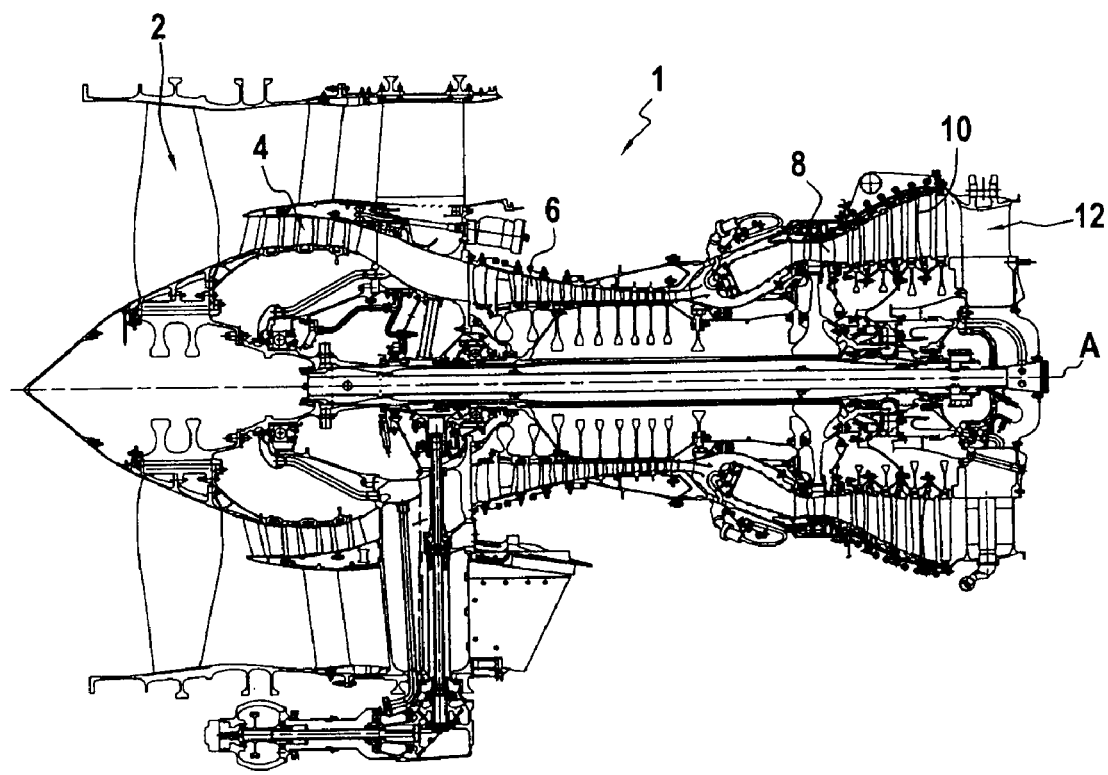
FIG. 1 shows an example of an airplane turbojet in axial section on a plane containing the axis A of rotation of the turbojet rotor.
Figure 2:
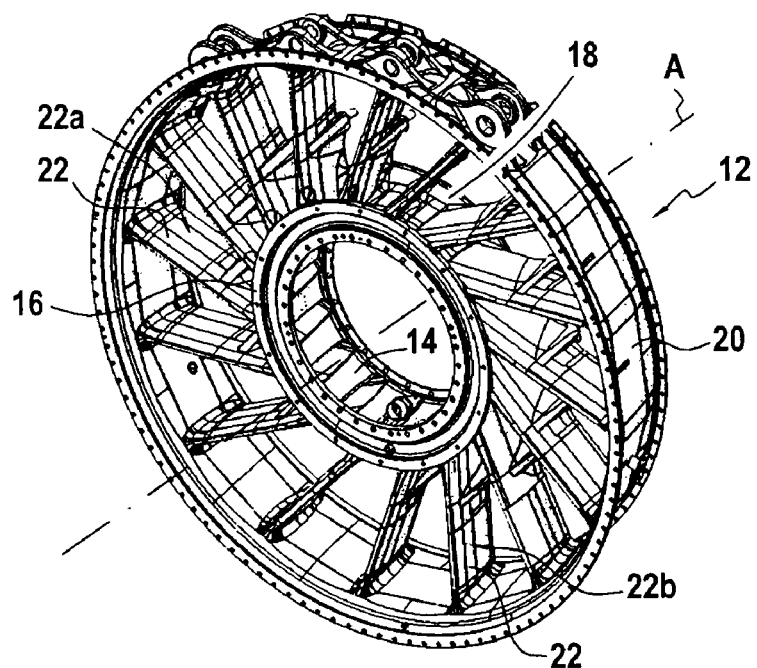
FIG. 2 is a front view in perspective of an example of an exhaust casing of the same type as the invention.
Figure 3:
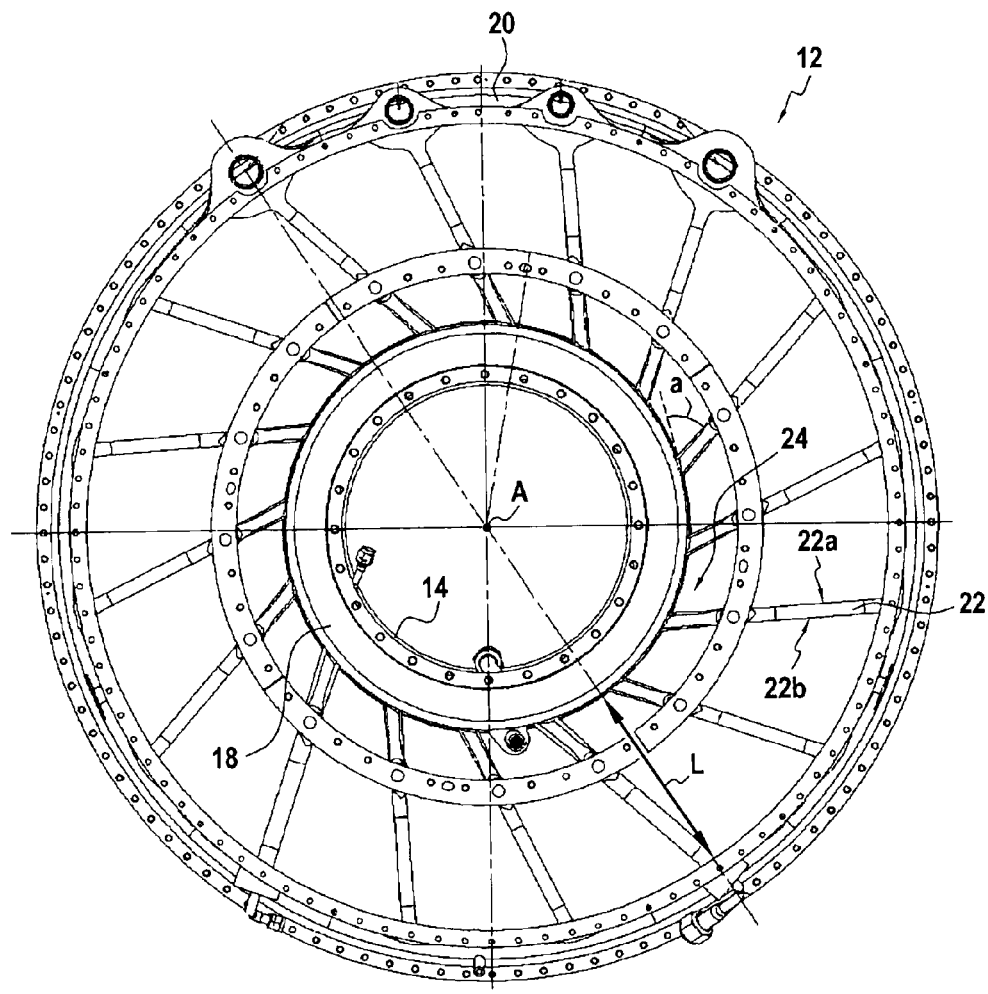
FIG. 3 is a rear view of the exhaust casing of FIG. 2, the plane of FIG. 3 being a radial plane, perpendicular to the axis A.

FIGS. 1 to 3 are described above and show an example of an exhaust casing of the same type as the invention. The invention relates more particularly to the connection portion (see FIGS. 3 and 4) between the first side face 22a of each arm 22 and each of the annular endplates 16, 18 of the hub 14.

Figure 4:
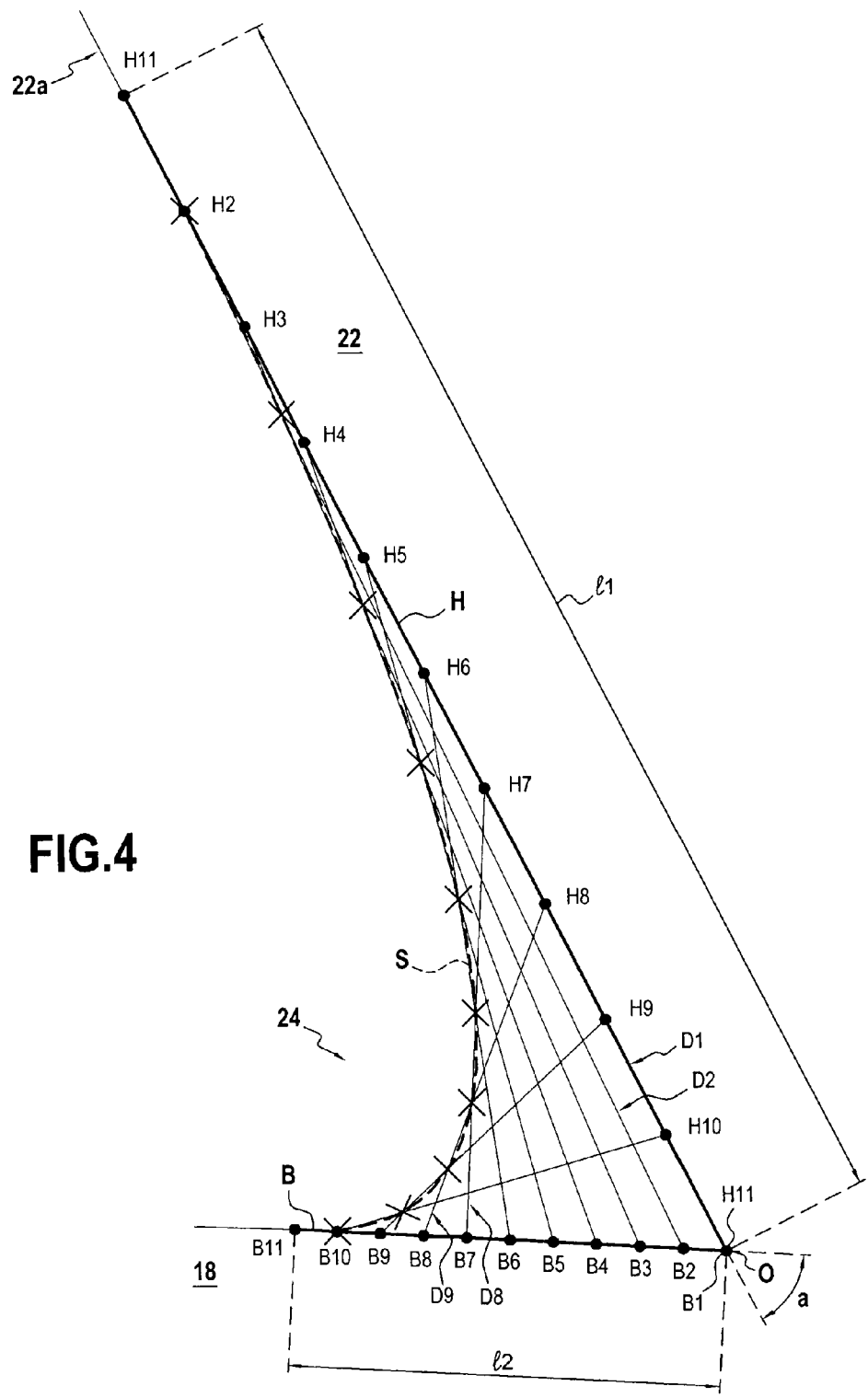
FIG. 4 is a detail view of the connection root between the downstream annular endplate of the hub and the first side face of one of the structural arms of the casing, shown in a radial section plane containing said connection root.

Such a connection portion 24 is shown in detail in FIG. 4, in section in a radial section plane containing said portion 24. In FIG. 4, it can be seen that the connection portion 24 between the first side face 22a of an arm 22 and the outer periphery of the downstream annular endplate 18 is a connection root of profile that is defined by a spline S.

The spline S passes through N control points, where N is equal to 10 in this example. These N control points are defined as follows: let O be the point of intersection in the radial section plane of FIG. 4 between the straight line extending the first side face 22a and the outer periphery of the downstream annular endplate 18. A first straight line segment H is selected starting from the point O and following the straight line that extends the first side face 22a in the section plane of FIG. 4. This segment H has a length $\ell 1$. This length $\ell 1$ is selected to be 3% to 15% of the length L (shown in FIG. 3). This segment H is subdivided into 10 equal segments by 11 points marked H1, H2, ..., H11, where the point H11 coincides with the point O, as shown in FIG. 4. Thereafter, a second straight line segment B is selected starting from the point O and following the tangent at the point O to the outer periphery of the downstream annular endplate 18, in the section plane of FIG. 4. The segment B is generally much shorter than the circular outer periphery of the annular endplate, so this segment remains very close to the outer periphery, and in FIG. 4 it appears to coincide with said outer periphery. The segment B has a length written $\ell 2$ selected to lie in the range 25% to 50% of the length $\ell 1$. This segment is subdivided into 10 equal segments by 11 points marked B1, B2, ..., B11, where the point B11 is the furthest from the point O, as can be seen in FIG. 4. Thereafter, 11 straight lines written D1, D2, ..., D11 are drawn that interconnect respectively the points B1 and H1, B2 and H2, ..., and B11 and H11 (it should be observed that the straight line D1 comprises the segment H and that the straight line D11 comprises the segment B). Thereafter, the points of intersection between the straight lines D1 and D2, D2 and D3, ..., and D10 and D11 are identified. This produces the 10 points of intersection identified by crosses in FIG. 4. Finally, a spline S is caused to pass through these 10 control points.

As an illustration, an exhaust casing as shown in the figures can present the following dimensions:
- inside diameter of the shroud 20: 1000 mm;
- outside diameter of the endplates 16, 18: 465 mm;
- spacing between the arms 22 at the shroud 20: 200 mm;
- length L: 535 mm (1000−465);
- length $\ell 1$: 40 mm (i.e. about 7.5% of L); and
- length $\ell 2$: 16 mm (i.e. about 40% of $\ell 1$).

What is claimed is:

1. An exhaust casing for a turbomachine, the casing comprising:
   a hub centered on an axis and carrying, on each of its upstream and downstream faces, an annular endplate that is coaxial with the hub;
   an outer shroud coaxial with the hub; and
   a plurality of arms interconnecting said hub and said shroud, each arm presenting opposite first and second side faces in which the hub and the outer shroud are spaced apart radially by a length written L; and
   in which, in a radial section plane, the first side face of each arm forms an acute angle with the tangent to the outer periphery of each endplate, said angle lying in the range 60° to 85°;
   wherein the first side face of each arm is connected to each endplate by a connection root of profile, in a radial section plane, that is defined by a spline passing via N control points, N being an integer greater than or equal to 10, these N control points being defined as follows:
   let O be the point of intersection in said radial section plane between the straight line extending the first side face and the outer periphery of an endplate;

let there be a first straight-line segment starting from the point O and following the straight line extending said first side face in said radial plane, this segment being of length written $\ell 1$ lying in the range 3% to 15% of the length L, and this segment being subdivided into N equal segments by N+1 points written H(1), H(2), . . . , H(N+1), the point H(N+1) coinciding with the point O;

let there be a second straight-line segment starting from the point O and following the tangent at the point O to the outer periphery of said endplate in said radial plane, said segment having a length written $\ell 2$ lying in the range 25% to 50% of $\ell 1$, and said segment being subdivided into N equal segments by N+1 points written B(1), B(2), . . . , B(N+1), the point B(N+1) being the furthest from the point O, and let D(1), D(2), . . . , D(N+1) be the N+1 straight lines respectively interconnecting the points B(1) to H(1), B(2) to H(2), . . . , and B(N+1) to H(N+1);

said N control points are the points of intersection between D(1) and D(2), between D(2) and D(3), . . . , and between D(N) and D(N+1).

2. A turbomachine including an exhaust casing according to claim 1.

\* \* \* \* \*